Jan. 7, 1969  E. A. J. MARCATILI  3,420,595
LENS SEQUENCE OF OPTIMUM LENS SPACING
Filed July 15, 1964  Sheet 1 of 3

FIG. 1

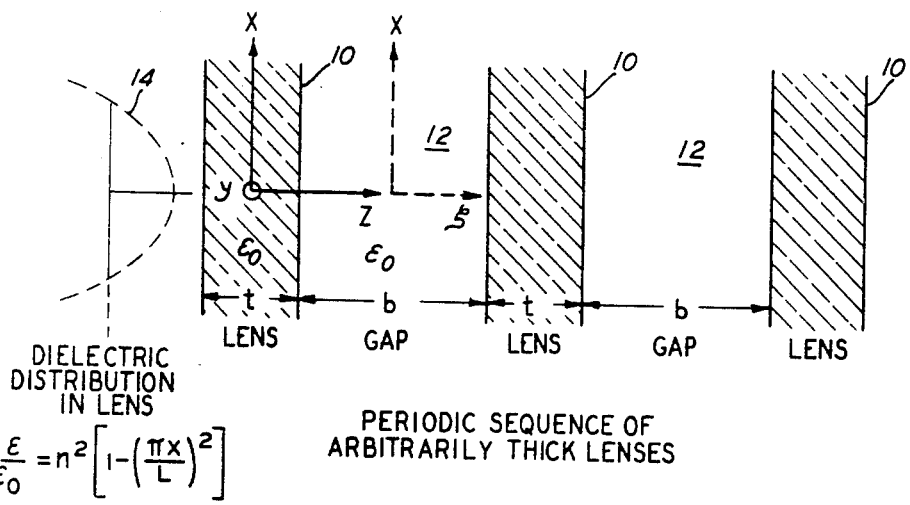

PERIODIC SEQUENCE OF ARBITRARILY THICK LENSES

DIELECTRIC DISTRIBUTION IN LENS
$$\frac{\varepsilon}{\varepsilon_0} = n^2 \left[1 - \left(\frac{\pi x}{L}\right)^2\right]$$

FIG. 2

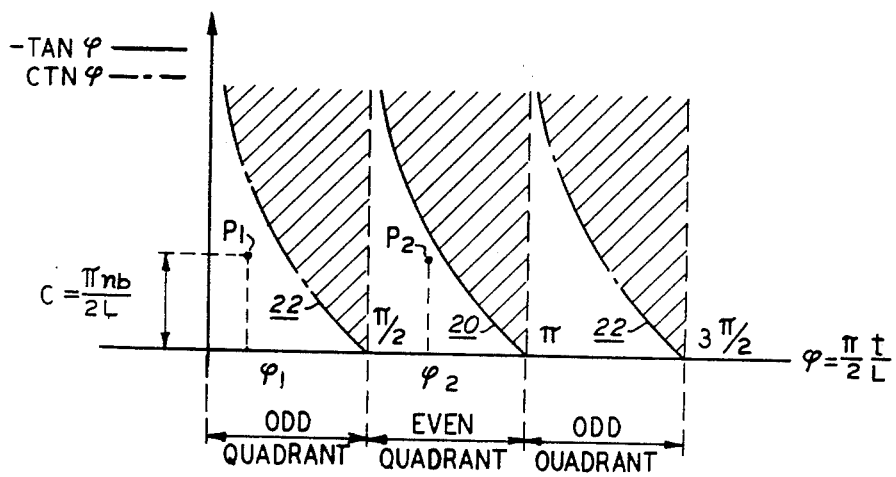

TRANSMISSION CONDITIONS FOR SEQUENCE OF LENSES
$C \leq \operatorname{CTN} \varphi$ FOR ODD QUADRANTS
$C \leq -\operatorname{TAN} \varphi$ FOR EVEN QUADRANTS

▨ CUT-OFF REGION
☐ TRANSMISSION REGION

INVENTOR
E. A. J. MARCATILI
BY H. O. Wright
ATTORNEY

BEAM SIZE IN PASS BAND REGIONS 1,3,5...OF FIG. 2

BEAM SIZE IN PASS BAND REGIONS 2,4,...OF FIG. 2

LENS  GAP  LENS

EQUIPHASE LINES FOR $b = \frac{2L}{n\pi} \operatorname{ctn} \frac{\pi}{2}\frac{t}{L}$ OR
$b = \frac{2L}{n\pi} \tan \frac{\pi}{2}\frac{t}{L}$. RADIUS OF CURVATURE AT A IS $\mathscr{S}_0$

RAY TRAJECTORY IN A GASEOUS LENS

United States Patent Office 3,420,595
Patented Jan. 7, 1969

3,420,595
LENS SEQUENCE OF OPTIMUM LENS SPACING
Enrique A. J. Marcatili, Fair Haven, N.J., assignor to Bell Telephone Laboratories, Incorporated, New York, N.Y., a corporation of New York
Filed July 15, 1964, Ser. No. 382,873
U.S. Cl. 350—96                                2 Claims
Int. Cl. G02b 5/14

ABSTRACT OF THE DISCLOSURE

This application describes an electromagnetic beam guidance system comprising a plurality of uniformly spaced dielectric slabs, each of which is characterized by a dielectric constant which decreases as a function of the square of the distance from the system axis. Two relationships are derived which relate the slab parameters to the maximum slab spacing. Since there are no limitations on the thickness of the slabs, the relationships cover the complete gamut from a sequence of infinitely thin slabs, to a continuous dielectric waveguide.

---

This invention relates to the transmission of ultrahigh frequency electromagnetic beams. More particularly, it relates to the transmission of said beams through a sequence of spaced, lens-like, focusing devices each of which comprises a thick "slab" of transparent dielectric material.

The lens-like devices with which the present invention is more particularly concerned are, in one form, of the general type which is becoming known to those skilled in this specific art as "gaseous lenses."

Numerous and varied forms of gaseous lenses have been suggested, typical forms being those disclosed and claimed in the following copending applications, all of which are assigned to applicant's assignee: Ser. No. 347,166, filed Feb. 25, 1964, by D. W. Berreman; Ser. No. 353,689, filed Mar. 23, 1964, by D. W. Berreman; Ser. No. 372,992, filed June 5, 1964, by D. W. Berreman; Ser No. 379,175, filed June 30, 1964, by D. W. Berreman and S. E. Miller; and Ser. No. 379,112, filed June 30, 1964, by A. C. Beck, G. E. Conklin and A. R. Hutson.

The present application is more particularly directed toward establishing the maximum spacing between lenses for which transmission will still take place and the optimum spacing between successive "lenses" to obtain the minimum beam size for transmission through a sequence of lens-like focusing devices, such as the gaseous lenses in which each device consists of an arbitrarily thick slab of transparent dielectric in which the dielectric constant tapers off radially, substantially in accordance with a quadratic law. The "slab" as taught in the above-mentioned copending applications may be of one gas or a mixture of several gases. The tapering of the dielectric constant is effected, for example, by temperature gradient effects or by controlled diffusion of gases of different refractive index into each other by a combination of such effects.

As will presently become apparent hereinunder, Maxwell's equations are solved for a sequence of focusing devices of the above-described general type. Since no limitations are introduced with respect to thickness of the slabs, the solutions cover the complete gamut from a sequence of infinitely thin lens devices to a continuous dielectric waveguide having a radially tapered dielectric constant at each and every transverse cross section.

The field configurations of the various modes of transmission together with their respective propagation constants, transmission frequency bands and cutoffs are calculated. Any arbitrary input field distribution can then be expanded in terms of the normal modes and the expansion will then determine the resulting fields throughout the system.

The formulas derived for sequences of thin lenses are found to give very satisfactory results even for lenses whose thickness and separation are equal to the focal length.

It is, accordingly, a principal object of the invention to determine the maximum spacing between consecutive lenses of a periodic sequence of arbitrarily thick lens-like members which will permit transmission of an ultrahigh frequency electromagnetic beam through the sequence of lenses.

A further object is to determine the optimum spacing between consecutive lenses from minimum beam size in a periodic sequence of arbitrarily thick lens-like members for an ultrahigh frequency energy beam transmission system.

Other and further objects, features and advantages of the invention will become apparent from a perusal of the detailed description of illustrative arrangements given hereinunder and defined in the appended claims taken in conjunction with the accompanying drawing, in which:

FIG. 1 illustrates diagrammatically a periodic sequence of arbitrarily thick lens-like devices;

FIG. 2 illustrates diagrammatically the transmission conditions for a sequence of lens-like devices as per FIG. 1;

INTRODUCTION

Figure 3A:
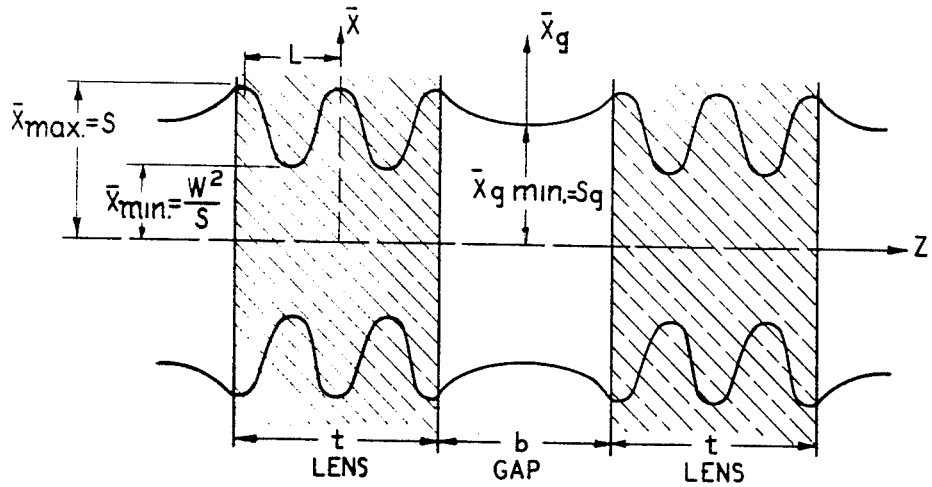
FIGS. 3A and 3B illustrate the energy beam size variations in the odd and even quadrants, respectively, of FIG. 2.

One possible long distance transmission medium for a beam of ultrahigh frequency electromagnetic waves, such as optical waves and the like, consists of a periodic sefuence of converging lenses. In order to negotiate unwanted but unavoidable bends of the axis of the sequence, it is ordinarily considered necessary to space the lenses as closely as is practicable. (See the article by J. R. Pierce entitled "Modes in Sequences of Lenses," published in The Proceedings of the Natural Academy of Science, vol. 47, 1961, pp. 1808 through 1832.) Nevertheless, ordinary solid dielectric lenses exhibit substantial surface scattering and therefore the minimum practicable spacing between such lenses depends to an appreciable degree on the tolerable transmission loss. With any type of lens, the maximum permissible spacing between consecutive lenses of such a sequence is of interest since it will, obviously, permit the use of a minimum number of lenses.

In the above-mentioned copending application of Berreman and Miller, it has been proposed that a gaseous lens can consist of a tube with hot walls through which a mild gas current at lower temperatures is forced to flow. At any cross section the temperature increases radially from the center to the wall. The density and consequently the dielectric constant are then maximum on the axis and decrease radially substantially in accordance with the square law.

Since such gaseous lenses do not involve any serious problem of scattering at the interfaces, they could be closely spaced except that in many instances gaps between them must exist for the circulation and/or cooling of the gas or gases employed to create them. The sequence of such lens-like focusers then is such that, in general, but not always necessarily, the gap between successive focusers is comparable to the thickness of the individual lens.

In this application it is proposed to calculate the field configuration of the possible modes of propagation as well as spacings which result in minimum beam size and the range of dimensions over which transmission is possible. For such purposes it is not essential to include the solid walls of the tubes or conduits in which the lenses are enclosed since the presence of such walls perturbs only slightly the field close to the axis. It is contemplated that energy beams of transverse cross-sectional are small compared to that of the conduit or tube will be employed and that they will be substantially centered in the conduit or tube.

The calculations are general, so that by changing the relative dimensions of gaps between successive lenses and the lens parameters it is possible to cover all of the range from a sequence of thin lenses to a continuous dielectric guide. (See "Resonant Modes in a Maser Interferometer," A. G. Fox and Tingye Li, Bell System Technical Journal, 40, pp. 453–488, March 1961; "Confocal Multimode Resonator for Millimeter through Optical Wavelength Masers," G. D. Boyd and J. P. Gordon, Bell System Technical Journal, 40 pp. 489–508, March 1961; "Generalized Confocal Resonator Theory," G. D. Boyd and H. Kogelnik, Bell System Technical Journal, 41, pp. 1347–1369, July 1962; and "On the Guided Propagation of Electromagnetic Wave Beams," G. Goubau and F. Schwering, I.R.E. Transactions on Antennas and Propagation, AP-9, pp. 248–255, May 1961.)

DESCRIPTION OF THE PROBLEM

The individual lens of the Berreman-Miller application is, by way of specific example, of circular revolution and the distribution of density, though decreasing almost with the square law in the radial direction, is in general different in successive transverse cross sections. The problem may be simplified for the purpose of analysis by assuming a sequence of two-dimensional lenses 10, separated by spaces 12, as illustrated diagrammatically in FIG. 1. Each lens has a thickness "$t$" in the direction of propagation and each space or gap 12 between consecutive lenses has a thickness "$b$." Each lens 10 also has, for the assumed two-dimensional type, a distribution of dielectric constant which is independent of (or constant) in both the $y$ and $z$ directions and varies in the $x$ direction with the parabolic law as illustrated by broken-line curve 14 and expressed by the equation $$\frac{\epsilon}{\epsilon_0} = n^2 \left[1 - \left(\frac{\pi x}{L}\right)^2\right] \quad (1)$$

The refractive index of the $yz$ plane is then $n$. $\epsilon$ and $\epsilon_0$ are the respective dielectric constants for the center of a lens and for a gap. The characteristic parameter of the lens-like medium, $L$, permits adjustment of the parabolic distribution and its physical significance will become more clearly apparent hereinunder.

This dielectric distribution is chosen because for small values of $\pi x/L$, it describes closely that of the gaseous lens and, simultaneously, it facilitates the solution of Maxwell's equations. It turns out that, in general, the field of every mode becomes negligible for values of $x > x_0$ such that $\pi x_0 L \ll 1$, and consequently the region where the dielectric constant is small or negative does not contribute appreciably to the guidance of the modes.

First, a sufficient general solution, for most practical purposes, of Maxwell's equations will be obtained for one of the lenses. Then by making $n=1$ and $L$ approach infinity, a general solution for the uniform spacing $b$ between consecutive lenses will be deduced. Finally, the tangential fields will be matched to satisfy the boundary conditions. Having demonstrated that this is possible, it follows that the choice of the "sufficiently general solution" is adequate.

Consider the electric field $E$, polarized along $y$ and independent of that coordinate. Calling $k=2\pi/\lambda$ the free space propagation constant, Maxwell's equation reads $$\frac{\partial^2 E}{\partial x^2} + \frac{\partial^2 E}{\partial z^2} + k^2 n^2 \left[1 - \left(\frac{\pi x}{L}\right)^2\right] E = 0 \quad (2)$$

A general solution of waves propagating in the $z$ direction is $$E = e^{-\frac{x^2}{w^2}} \sum_{\nu=0}^{\infty} A_\nu e^{-\mathrm{i}knz\sqrt{1-\pi\frac{2\nu+1}{nkL}}} H_\nu\left(\frac{\sqrt{2}x}{w}\right) \quad (3)$$

where $A_\nu$ are arbitrary constants, and $$w = \sqrt{\frac{2L}{\pi k n}} \quad (4)$$

which is the beam size defined as the distance $x$ at which the exponential $$e^{-\frac{x^2}{w^2}}$$

reaches the value $e^{-1}$ and $$H_\nu(\xi) = (-1)^\nu e^{\xi^2} \frac{d^\nu}{d\xi^\nu} e^{-\xi^2}$$

is the Hermite polynomial of order $\nu$. (See "Tables of Higher Functions," by Jahnke, Emde and Losch, McGraw-Hill Book Company, Inc., New York, 1960, pp. 101 through 104.) Hermite polynomials of lowest degree are:

$H_0(\xi) = 1$; $H_1(\xi) = 2\xi$; $H_2(\xi) = 4\xi^2 - 2$; $H_3(\xi) = 8\xi^3 - 12\xi$

That each term of Equation 3 is a solution of Equation 2 has been shown by J. R. Pierce and can be checked by substitution or by the usual separation of variables technique and consequent solution of the two ensuing differential equations. Expression 3 can be simplified because the square root can be expanded in series and assuming $$\left(\frac{\nu}{kL}\right)^2 \ll 1 \quad (5)$$

the first two terms are retained and the electric field becomes $$E \cong e^{-\mathrm{i}\theta - \frac{x^2}{w^2}} \sum_{\nu=0}^{\infty} A_\nu e^{\frac{\mathrm{i}\pi\nu z}{L}} H_\nu\left(\frac{\sqrt{2}x}{w}\right) \quad (6)$$

where $$\theta = knz\left(1 - \frac{\pi}{2nkL}\right)$$

A periodic field configuration that reproduces itself at each lens will next be sought. For reasons of symmetry then, the planes of symmetry of the lenses and gaps must be equiphase surfaces.

The field at the plane $z=0$ is chosen to be $$\frac{e^{-\frac{x^2}{s^2}}}{\sqrt{s}} H_m \frac{\sqrt{2}x}{s}$$

where $m$ is an integer and $s$ is an arbitrary parameter for the time being. Therefore for $z=0$, from Equation 6, it follows that $$\sum_{\nu=0}^{\infty} A_\nu e^{-\frac{x^2}{w^2}} H_\nu\left(\frac{\sqrt{2}x}{w}\right) = \frac{e^{-\frac{x^2}{s^2}}}{\sqrt{s}} H_m\left(\frac{\sqrt{2}x}{s}\right) \quad (7)$$

from which $A_\nu$ is calculated using orthogonality properties of the Gaussian-Hermitian product. (See above-mentioned tables of Jahnke et al.)

$$A_\nu = \frac{\sqrt{2}}{\sqrt{\pi} s 2^\nu \nu! w} \int_{-\infty}^{\infty} e^{-\xi^2\left(\frac{1}{s^2} + \frac{1}{w^2}\right)} H_m\left(\frac{\sqrt{2}\xi}{s}\right) H_\nu\left(\frac{\sqrt{2}\xi}{w}\right) d\xi \quad (8)$$

Substituting this result in Equation 6

$$E=\sqrt{\frac{2}{\pi s}}\frac{e^{-\frac{x^2}{w^2}-i\theta}}{w}\int_{-\infty}^{\infty}e^{-\xi^2\left(\frac{1}{s^2}+\frac{1}{w^2}\right)}H_m\left(\frac{\sqrt{2}\xi}{s}\right)d\xi$$

$$\sum_{\nu=0}^{\infty}H_\nu\left(\frac{\sqrt{2}x}{w}\right)\frac{H_\nu\left(\frac{\sqrt{2}\xi}{w}\right)e^{i2\pi\nu\frac{z}{L}}}{2^\nu\nu!} \quad (9)$$

Once the summation is performed (See "Higher Transcendental Functions," by Erdelyi et al., McGraw-Hill Book Company, Inc., New York, 1953, vol. 2, pp. 192 through 196.)

$$E=\frac{e^{-i\theta-\frac{x^2}{iw^2}\operatorname{ctn}\frac{\pi z}{L}}}{w\sqrt{\frac{\pi s}{2}\left(1-e^{i2\pi\frac{z}{L}}\right)}}\int_{-\infty}^{\infty}H_m\left(\frac{\sqrt{2}\xi}{s}\right)$$

$$=e^{-\xi^2\left[\frac{1}{s^2}+\frac{1}{iw^2}\operatorname{ctn}\frac{\pi z}{L}\right]+\frac{4\xi x}{w^2}\frac{e^{i\pi\frac{z}{L}}}{1-e^{i2\pi\frac{z}{L}}}}d\xi \quad (10)$$

The integral is of the form $$I=\int_{-\infty}^{\infty}H_m(\alpha)e^{-\frac{(\alpha-Q)^2}{P}}d\alpha$$

where P and Q are independent of $\xi$ and the result is (Erdelyi et al., supra):

$$I=(\pi P)^{1/2}(1-P)^{m/2}H_m\left(\frac{Q}{\sqrt{1-P}}\right)$$

Therefore the electric field inside a lens expressed in closed form is $$E=e^{-i\left[kn\left(z-\frac{x^2}{2R}\right)-\left(m+\frac{1}{2}\right)\tan^{-1}\left(\frac{w^2}{s^2}\tan\frac{\pi z}{L}\right)\right]}$$

$$\frac{e^{-\left(\frac{x}{\bar{x}}\right)^2}}{\sqrt{\bar{x}}}H_m\left(\sqrt{2}\frac{x}{\bar{x}}\right) \quad (11)$$

where $$R=\frac{L}{\pi}\left[\frac{1+\frac{w^4}{s^4}}{\left(1-\frac{w^4}{s^4}\right)\sin\frac{2\pi z}{L}}+\operatorname{ctn}\frac{2\pi z}{L}\right] \quad (12)$$

and $$\bar{x}=s\sqrt{\frac{1}{2}\left[1+\frac{w^4}{s^4}+\left(1-\frac{w^4}{s^4}\right)\cos\frac{2\pi z}{L}\right]} \quad (13)$$

Let us find the physical significance of R and $\bar{x}$. Equating in relation 11 the imaginary part of the exponent to a constant, the equation of an equiphase surface or wavefront is obtained. The radius of curvature of that wavefront at the plane of symmetry $x=0$ is measured by R, relation 12. On the other hand, $\bar{x}$, relation 13, is a measuring of the beam size and, specifically, for $m=0$ it determines at a given abscissa $z$ the ordinate at which the field intensity is $1/e$ of the maximum occurring at $x=0$.

The electric field in the uniform dielectric gap between two lenses can be derived from the previous expression by making $n=1$ and $L\to\infty$ and by substituting another constant $s_g$ for $s$. Again the plane of symmetry of the gap $z=b+t/2$ must be an equiphase surface. This is achieved by substituting $$\zeta=z-\frac{b+t}{2}$$

for $z$. The electric field in the gap between consecutive lenses is then $$E_g=e^{-i\left[k\left(\zeta-\frac{x^2}{2R_g}\right)-\left(m+\frac{1}{2}\right)\tan^{-1}\frac{2\zeta}{ks_g^2}\right]}$$

$$\frac{e^{-\left(\frac{x}{\bar{x}_g}\right)^2}}{\sqrt{\bar{x}_g}}H_m\left(\sqrt{2}\frac{x}{\bar{x}_g}\right) \quad (14)$$

with $$R_g=\frac{s_g^4k^2}{4\zeta}\left[1+\left(\frac{2\zeta}{ks_g^2}\right)^2\right] \quad (15)$$

and $$\bar{x}_g=s_g\sqrt{1+\left(\frac{2\zeta}{ks_g^2}\right)^2} \quad (16)$$

This solution of Maxwell's equation for free space subject to the approximation of relation 5 coincides exactly with the solution found by G. D. Boyd and J. P. Gordon, as reported in their article entitled "Confocal Multimode Resonator for Millimeter Through Optical Wavelength Masers," published in the Bell System Technical Journal, vol. 40, pp. 489 through 508, for March 1961, for confocal cylindrical mirrors of infinite aperture using Huyghens principle.

To match the fields of relations 11 and 14 at the interfaces, the $x$ dependence of the field at both sides must coincide. The fact that it can be matched guarantees that the Maxwell equations are satisfied simultaneously in the lenses and in the gaps. It can be verified that if the tangential electric field continuity is satisfied, the tangential magnetic field continuity is also guaranteed. By considering waves that propagate in both directions, it could be possible to take into account reflections at the interfaces, but it is, rather, assumed that at each interface there is a matching mechanism that prevents reflections. Furthermore, in the case of gaseous lenses, the small changes of dielectric constants automatically insure negligible reflection at the interfaces.

It is, accordingly, permissible to write the equality of the coefficients of $x$ and $x^2$ in both expressions 11 and 14 at $z=t/2$ of the lens and $\zeta=-b/2$ of the gap. This implies making both the radius curvature of the phase front and the beam size the same at the interface, $$R\left(z=\frac{t}{2}\right)=R_g\left(\zeta=-\frac{b}{2}\right) \quad (17)$$

$$\bar{x}\left(z=\frac{t}{2}\right)=\bar{x}_g\left(\zeta=-\frac{b}{2}\right) \quad (18)$$

From them together with relations 12, 13, 15 and 16 the values of $s$ and $s_g$ that guarantee the matching at the interfaces can be deduced. They are:

$$s=w\left[\frac{1+C\operatorname{ctn}\varphi}{1-C\tan\varphi}\right]^{1/4} \quad (19)$$

and $$s_g=w(1+C\operatorname{ctn}\varphi)^{1/4}(1-C\tan\varphi)^{1/4} \quad (20)$$

where $$C=n\frac{\pi}{2}\frac{b}{L} \quad (21)$$

$$\varphi=\frac{\pi}{2}\frac{t}{L} \quad (22)$$

$$w=\sqrt{\frac{2L}{\pi kn}} \quad (23)$$

Both $s$ and $s_g$ must be real quantities, otherwise the fields given in relations 11 and 14 become infinite as $x\to\infty$. This establishes that a mode can propagate in the sequence of lenses either when $$C\leq\operatorname{ctn}\varphi$$

or when $$C\leq-\tan\phi$$

Their equivalents in explicit form are $$b\leq\frac{2L}{n\pi}\operatorname{ctn}\frac{\pi t}{2L} \quad (26)$$

and $$b \leq -\frac{2L}{n\pi} \tan \frac{\pi t}{2L} \quad (27)$$

In FIG. 2 the positive portions 20, 22 of both $-\tan \varphi$ and $ctn\, \varphi$, respectively, are each plotted as a function of $\varphi$. The unshaded areas represent the loci of the points where transmission can take place. In effect a point $P_1$ (in any odd quadrant) of abscissa $\varphi_1$ and ordinate $C=\pi nb/2L$ satisfies the inequality 24 while a point like $P_2$ (in any even quadrant) of abscissa $\varphi_2$ and ordinate $C=\pi nb/2L$ satisfies the inequality 25.

If $b=0$, the sequence of lenses is obviously reduced to a continuous waveguide and, of course, transmission takes place no matter what the value of $\varphi$ is. But suppose that $\varphi=\varphi_1$ (FIG. 2) and the gap $b$ is progressively increased. Then, as long as $b \leq 2L/\pi n\, ctn\, \varphi_1$ transmission will take place. Similarly, for $\varphi=\varphi_2$ (FIG. 2) as long as $b \leq -2L/n \tan \varphi_2$ transmission will take place.

Ordinarily $\varphi$ will lie in the first (odd) quadrant and solution of relation 26 will result in a positive quantity. In exceptional cases, $\varphi$ may lie in an even quadrant, in which case solution of relation 26 will result in a negative quantity, in which case solution of relation 27 is resorted to and will result in a positive quantity. A negative quantity corresponds to a negative spacing which, of course, cannot be realized physically.

THE FIELDS INSIDE AND OUTSIDE OF THE LENSES

The sequence of lenses admits a complete set of modes. For each mode, the field inside, relation 11, and outside, relation 14, the lenses is a wave traveling in the $z$ direction whose amplitude, period and equiphase surfaces or wavefront vary along $z$.

The amplitude varies, as previously stated, along $x$ as a product of a Gaussian function and a Hermite polynomial, the degree of which depends on the propagation mode under consideration.

Figure 3B:
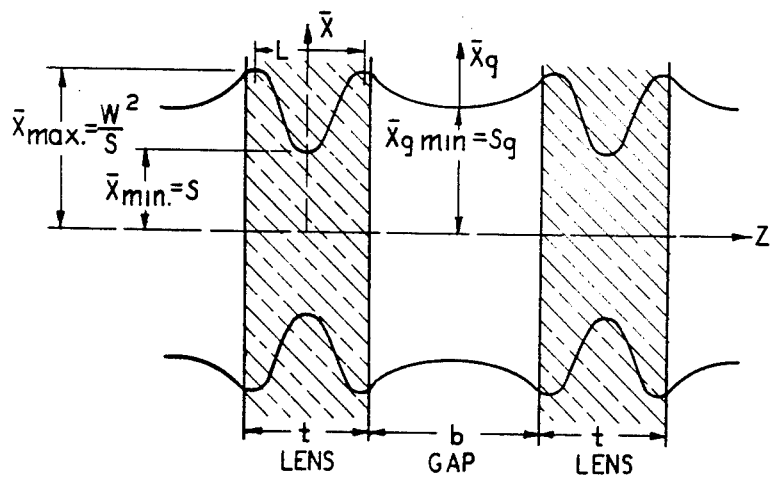

In FIGS. 3A and 3B the beam sizes $x$, relation 13, and $\bar{x}_g$, relation 16, are plotted qualitatively. From these equations the physical significance of $s$ and $s_g$ is obtained. They are the beam sizes at the plane of symmetry in each lens $(z=0)$ and the plane of symmetry in each gap $(\zeta=0)$ respectively. If $w/s \leq 1$, that is in the stable regions of odd quadrants in FIG. 2, the maximum and minimum values along the $z$ axis within the lenses occur at $z=qL$ and $2q+1/2L$ respectively, where $q$ is an integer. Those maxima and minima beam sizes are $$\bar{x}_{max}=s=w\left(\frac{1+C ctn\phi}{1-C \tan \phi}\right)^{1/4}$$

$$=\sqrt{\frac{2L}{\pi nk}}\left(\frac{1+\frac{\pi nb}{2L}ctn\frac{\pi t}{2L}}{1-\frac{\pi nb}{2L}\tan\frac{\pi t}{2L}}\right)^{1/4} \quad (28)$$

$$\bar{x}_{min}=\frac{w^2}{s}=w\left(\frac{1-C \tan \varphi}{1+C ctn\varphi}\right)^{1/4}$$

$$=\sqrt{\frac{2L}{\pi nk}}\left(\frac{1-\frac{\pi nb}{2L}\tan\frac{\pi t}{2L}}{1+\frac{\pi nb}{2L}ctn\frac{\pi t}{2L}}\right)^{1/4} \quad (29)$$

and the period between two successive maxima is $L$. The square root of the product of the maximum and minimum beam sizes in the dielectric is $$\sqrt{\bar{x}_{max}\bar{x}_{min}}=w$$

and coincides with the beam size $w$ of the lens-like medium.

In the gap there is only a minimum for the beam size which occurs at $\zeta=0$ and is obtained from relations 16 and 20:

$$\bar{x}_{g\,min}=s_g=w(1+Cctn\varphi)^{1/4}(1-C\tan\varphi)^{1/4}$$

$$=\sqrt{\frac{2L}{\pi nk}}\left(1+\frac{\pi nb}{2L}ctn\frac{\pi t}{2L}\right)^{1/4}\left(1-\frac{\pi nb}{2L}\tan\frac{\pi t}{2L}\right)^{1/4} \quad (30)$$

In the stable regions of even quadrants in FIG. 2, where $w/s>1$, minimum and maximum beam sizes (opposite of the previous case) occur within the lenses again at $z=qL$ and $2q+1/2L$ respectively. Those extreme values are given by relations 29 and 28 respectively. Again relation 30 measures the only minimum in the gaps. See FIG. 3B.

The field in the gaps at the extreme condition $$\varphi=q=\frac{\pi}{2}+\delta$$

(with $\delta \to 0$ and $q$ any integer) ... or its equivalent $t/L=0, 1, 2, 3 \ldots$ et cetera, will next be considered. Then, except for $C=0$, the minimum beam size in the gap $\bar{x}_{g\,min}$ becomes infinity according to relation 30 no matter what the gap is, and the electric field, relation 14, is reduced to a plane wave traveling in the $z$ direction for any finite value of $m$. Nevertheless, if a value of $s_g$ is selected such that $$s_g=\frac{(2m)^{1/2}}{\pi}\lambda_x$$

where $\lambda_x$ is an arbitrary length, then (see Erdelyi et al., supra)

$$\lim_{m \to \infty} H_m\left(\frac{\sqrt{2}x}{s_g}\right)=\lim_{m \to \infty} H_m\left(\frac{\pi x}{m^{1/2}\lambda_x}\right) \propto \begin{cases} \cos \frac{2\pi x}{\lambda_x} \text{ if } m \text{ is even} \\ \sin \frac{2\pi x}{\lambda_x} \text{ if } m \text{ is odd} \end{cases}$$

and the wave propagating along $z$ is a standing wave along $x$ varying sinusoidally with period $\lambda_x$.

For the other extreme cutoff condition, $C=ctn\, \varphi$ or $C=-\tan \varphi$, relation 24 and 25 respectively, or their equivalent $$b=\frac{2L}{n\pi}ctn\frac{\pi}{2}\frac{t}{L} \text{ or } b=-\frac{2L}{n\pi}\tan\frac{\pi}{2}\frac{t}{L}$$

relations 26 and 27 respectively, the minimum beam width in the gap $\bar{x}_{g\,min}$, relation 30, is reduced to zero and the field in the gap, relation 14, for $m=0$, becomes $$E_z=e^{-ik\zeta}\left(1+\frac{x^2}{2\zeta^2}\right)$$

Figure 4:
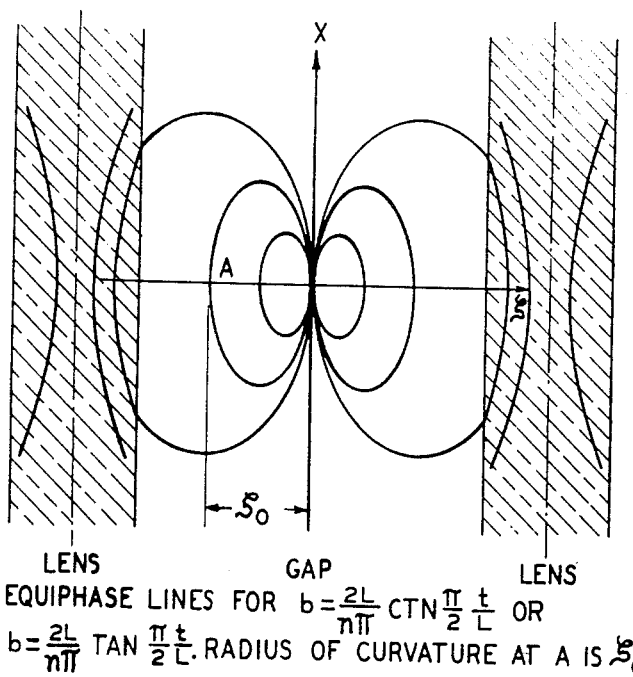
FIG. 4 is a diagram of equiphase lines for a "lens" system of the invention.

The family of equiphase lines are $$\zeta_0=\zeta+\frac{x^2}{2\zeta} \quad (31)$$

where $\zeta_0$ identifies the member of the family that cuts the $z$ axis at $\zeta=\zeta_0$, FIG. 4. The radius of curvature of those lines at $\zeta=\zeta_0$ and $x=0$ is $\zeta_0$. Therefore the two extreme cutoff conditions indicated above correspond either to a plane wave in the gap, or to concentric waves if one observes only the field in the region close to the plane, $x=0$. They are equivalent to the cutoff condition of Fabry-Perot resonators with plane and concentric mirrors or to the cutoff condition of sequences of iris and concentric lenses respectively. See the article by Fox et al., and two articles by Boyd et al., supra.)

The condition under which the beam is closely concentrated on the $z$ axis are found by minimizing $s$ given in relation 28. For a given set of lenses ($nL$ and $t$ fixed), it is not possible to vary the gap $b$ and find a minimum.

For a fixed gap $b$, and dielectric distribution $L$, and refractive index $n$, the minimum of $s$ as a function of the lens thickness $t$ is obtained making $$\frac{\partial s}{\partial t}=\frac{\partial s}{\partial \varphi}=0$$

Its solution yields the requirement (odd quadrants)

$$C = \operatorname{ctn} 2\varphi \tag{32}$$

or its equivalent (odd quadrants)

$$\frac{\pi n b}{2L} = \operatorname{ctn} \frac{\pi t}{L} \tag{33}$$

from which $$b = \frac{2L}{\pi n} \operatorname{ctn} \frac{\pi t}{L} \tag{33a}$$

For even quadrants, to obtain a positive quantity, the relation is $$b = -\frac{2L}{\pi n} \tan \frac{\pi t}{L} \tag{33b}$$

When relation 33 is substituted in relation 28 it yields $$s_{\min} = w[(1+C^2)^{1/2}] = \left(\frac{2L}{\pi n k}\right)^{1/2} \sqrt{\sqrt{1 + \left(\frac{\pi n b}{2L}\right)^2} + \left(\frac{\pi n b}{2L}\right)} \tag{34}$$

Naturally if the gap $b$ is reduced to zero $$s_{\min} = w = \left(\frac{2L}{\pi n k}\right)^{1/2}$$

For the same condition, relation 32 or relation 33, the beam size in the gap at any abscissa $\xi$ is derived from relations 16, 20 and 32:

$$\bar{x}_{g0} = w(1+C^2)^{1/4}\left[1 + \frac{C^2}{1+C^2}\left(\frac{2\xi}{b}\right)^2\right]^{1/2}$$

$$= \sqrt{\frac{2L}{\pi n k}}\left[1 + \left(\frac{\pi n b}{2L}\right)^2\right]^{1/4}\left[1 + \frac{\left(\pi n \frac{\xi}{L}\right)^2}{1 + \left(\frac{\pi n b}{2L}\right)^2}\right]^{1/2} \tag{35}$$

The ration between the beam sizes at $\xi = \pm b/2$ and $\xi = 0$ is $$\frac{\bar{x}_{g0}\left(\xi = \pm \frac{b}{2}\right)}{\bar{x}_{g0}(\xi = 0)} = \left(2 - \frac{1}{1+C^2}\right)^{1/2} = \left[2 - \frac{1}{1 + \left(\frac{\pi n b}{2L}\right)^2}\right]^{1/2} \tag{36}$$

SEQUENCE OF FEEBLE LENSES

Except for relation 5, results above have been obtained without approximations. Feeble or weak lenses will next be considered. They are characterized by $$\varphi = \frac{\pi}{2}\frac{t}{L} \ll 1 \tag{37}$$

and in all previous results each circular function can be replaced by its leading term.

The relation of the characteristic length L of the lenslike focuser to its focal length is then considered. To calculate the focal length of such a lens, as illustrated in the diagrammatic showing of FIG. 5, the ray trajectory is determined from the equation $$\frac{d^2x}{dz^2} = \frac{1}{n}\frac{dn}{dx}$$

and from relation 1

$$\frac{d^2x}{dz^2} = \frac{1}{\sqrt{1 - \left(\frac{\pi x}{L}\right)^2}} \frac{d}{dx}\sqrt{1 - \left(\frac{\pi x}{L}\right)^2} \tag{38}$$

For paraxial rays $$\frac{\pi x}{L} \ll 1 \tag{39}$$

and the trajectory for a ray entering the lens parallel to the $z$ axis at a distance $x_0$ is $$x = x_0 \cos \frac{\pi}{L} z \tag{40}$$

The angle of refraction at the output surface is $$\theta_r = \frac{n\pi}{L} x_0 \sin \frac{\pi t}{L} \tag{41}$$

Figure 5:
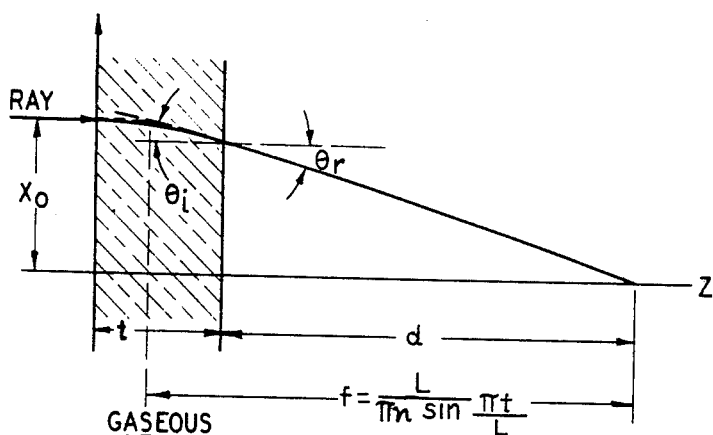
FIG. 5 is a diagram of a ray trajectory for a gaseous lens intended for use in systems of the invention.

Then from simple geometric considerations in FIG. 5, the focal length $f$ results $$f = \frac{L}{\pi n \sin \frac{\pi t}{L}} \tag{42}$$

and because of the inequality 37, the characteristic length L of the focusing medium is related to the thickness of the lens and its focal length by $$L = \pi \sqrt{n t f} \tag{43}$$

The characteristic length L results from the known phenomenon in optics that in passing through a focusing medium the beam size varies periodically between discrete maximum and minimum values so that the contour of its longitudinal envelope varies in substantially sinusoidal manner, the length L being the distance between successive maximums of the contour of the envelope. The thin lens requirement, relation 37, becomes then $$\varphi = \frac{1}{2}\sqrt{\frac{t}{nf}} \ll 1 \tag{44}$$

Using relation 43 together with the simplifying assumption, relation 44, re-evaluate the maximum and minimum beam sizes, relations 19 and 20, for feeble lenses $$s = \left(\frac{tf\lambda^2}{n\pi^2}\right)^{1/4}\left(\frac{1 + \frac{nb}{t}}{1 - \frac{b}{4f}}\right)^{1/4} \tag{45}$$

$$s_g = \left(\frac{tf\lambda^2}{n\pi^2}\right)^{1/4}\left(1 + \frac{nb}{t}\right)^{1/4}\left(1 - \frac{b}{4f}\right)^{1/4} \tag{46}$$

It may be of interest to know the distance $h$ between the principal planes which calculated with the help of relations 41 and 42 turns out to be $$h = \frac{2L}{\pi n} \tan \frac{\pi t}{2L} - t \tag{47}$$

Expanding the circular function in series, keeping only the first two terms and substituting for L its equivalent, relation 43, $$h = t\left(\frac{1}{n} - 1\right) \times \frac{t^2}{12n^2 f} \tag{48}$$

EXAMPLE

Assuming a sequence of gaseous lenses such that $$b = t = f = 0.25 \text{ m}$$

(The focal length $f$, as illustrated in FIG. 5, is the distance between the focal point and the principal plane of the gas lens.)

$$\lambda = 0.6328 \cdot 10^{-6} \text{ m}$$

$$n \simeq 1$$

For these dimensions $\varphi = 0.5$, which may not seem to well satisfy the inequality 44. Nevertheless, if the extreme beam sizes $s$ and $s_g$ are calculated as well as the characteristic length or parameter L of the lens using relations 45, 46 and 43.

$$\left.\begin{array}{l} s = 0.288 \text{ mm.} \\ s_g = 0.249 \text{ mm.} \\ L = 0.785 \text{ m.} \end{array}\right\} \quad (49)$$

For comparison, if the extreme beam sizes are calculated rigorously using the exact expressions 19, 20, and deriving L from relation 42, there results $$\left.\begin{array}{l} s = 0.28 \\ s_g = 0.23 \\ L = 0.73 \end{array}\right\} \quad (50)$$

The two sets of results 49 and 50 are extremely similar and show the usefulness of thin lens formulas even for lenses with comparable values of $t$ and $f$.

Since it is not infrequently important insofar as it is practicable to do so to keep the beam size small, it should be noted that the spacing $b$ between lenses giving the smallest beam size is, from relation 33a, $$b = \frac{2L}{n\pi} \operatorname{ctn} \frac{\pi t}{L}$$

where $\varphi$ falls within an odd quadrant or, from relation 33b, $$b = -\frac{2L}{n\pi} \tan \frac{\pi t}{L}$$

where $\varphi$ falls within an even quadrant. See FIG. 2.

Numerous and varied other applications of the principles of the invention will readily occur to those skilled in the art. The applications discussed above are to be taken as purely illustrative and in no way limiting the invention.

What is claimed is:

1. A guidance system for electromagnetic wave energy comprising:
    a sequence of transparent dielectric slabs, uniformly spaced apart a distance $b$ greater than zero along the longitudinal axis of said system;
    each slab being characterized by a dielectric constant distribution given by $$\frac{\epsilon}{\epsilon_0} = n^2 \left[ 1 - \left(\frac{\pi x}{L}\right)^2 \right]$$

where $\epsilon$ is the dielectric constant of the slab at any distance $x$ from the axis,
$\epsilon_0$ is the dielectric constant of the material between slabs,
$n$ is the index of refraction of the slab along the axis, and
$L$ is a constant, characteristic of the dielectric slab material;
the optimum thickness $t$ of said slabs being given by $$b = \frac{2L}{n\pi} \text{ cotangent } \frac{\pi t}{L} \text{ or } b = -\frac{2L}{n\pi} \text{ tangent } \frac{\pi t}{L}$$

whichever gives the shortest value for $t$.

2. The system according to claim 1 wherein said energy is an optical beam.

References Cited

UNITED STATES PATENTS 3,101,472  8/1963  Goubau.

JOHN K. CORBIN, *Primary Examiner.*

U.S. Cl. X.R.
350—179, 213